(12) United States Patent
Ruston et al.

(10) Patent No.: US 11,028,782 B2
(45) Date of Patent: Jun. 8, 2021

(54) PRESSURE RELIEF ARRANGEMENT FOR A GAS TURBINE ENGINE

(71) Applicant: ROLLS-ROYCE plc, London (GB)

(72) Inventors: Simon M. Ruston, Derby (GB); Rong Yang, Derby (GB); Matthew Fox, Derby (GB); Aniket Anand Kulkarni, Bangalore (IN)

(73) Assignee: Rolls-Royce plc

( * ) Notice: Subject to any disclaimer, the term of this patent is extended or adjusted under 35 U.S.C. 154(b) by 141 days.

(21) Appl. No.: 16/124,559

(22) Filed: Sep. 7, 2018

(65) Prior Publication Data

US 2019/0112986 A1   Apr. 18, 2019

(30) Foreign Application Priority Data

Oct. 12, 2017   (IN) .............................. 201711036298
Dec. 14, 2017   (GB) ...................................... 1720831

(51) Int. Cl.
| | | |
|---|---|---|
| F01D 25/24 | (2006.01) | |
| F02C 9/18 | (2006.01) | |
| B64D 29/08 | (2006.01) | |
| F02K 3/06 | (2006.01) | |
| F02K 3/075 | (2006.01) | |

(52) U.S. Cl.
CPC ................ *F02C 9/18* (2013.01); *B64D 29/08* (2013.01); *F02K 3/06* (2013.01); *F02K 3/075* (2013.01)

(58) Field of Classification Search
CPC ......... F01D 21/14; F01D 25/24; B64D 29/00; B64D 29/08
See application file for complete search history.

(56) References Cited

U.S. PATENT DOCUMENTS

| | | | |
|---|---|---|---|
| 3,831,705 A | | 8/1974 | Glance |
| 4,232,513 A | * | 11/1980 | Pearson .................. F01D 21/14 |
| | | | 137/797 |
| 4,656,793 A | * | 4/1987 | Fons ...................... B65D 90/36 |
| | | | 52/1 |
| 4,825,644 A | | 5/1989 | Bubello et al. |
| 4,899,960 A | * | 2/1990 | Hararat-Tehrani ........ B64C 1/18 |
| | | | 137/68.11 |
| 5,704,207 A | * | 1/1998 | Jensen ................... B64D 33/04 |
| | | | 60/39.091 |

(Continued)

FOREIGN PATENT DOCUMENTS

| | | |
|---|---|---|
| CN | 102926479 | 2/2013 |
| EP | 3382179 A1 | 10/2018 |

(Continued)

OTHER PUBLICATIONS

Great Britain Search Report dated Jul. 25, 2018, issued in GB Patent Application No. 1720831.5.

(Continued)

*Primary Examiner* — Ninh H. Nguyen
(74) *Attorney, Agent, or Firm* — Barnes & Thornburg LLP

(57) ABSTRACT

A pressure relief arrangement for a gas turbine engine comprises a hinged door and a mount. A plastically deformable member is provided between and coupled to the hinged door and the mount. The deformable member is configured to deform between a non-deformed state when the door is in a closed position and an elongated deformed state when the door is in an open position.

16 Claims, 3 Drawing Sheets

(56) References Cited

U.S. PATENT DOCUMENTS 7,204,472 B2 * 4/2007 Jones .................... F16K 15/031
 251/129.06
2011/0240137 A1 10/2011 Vauchel

FOREIGN PATENT DOCUMENTS

WO 2014100001 6/2014
WO 2015/010271 A1 1/2015

OTHER PUBLICATIONS

Extended European Search Report completed on Feb. 19, 2019 and issued in connection with EP Appln. No. 18194027.1, 8 pages.

* cited by examiner

PRESSURE RELIEF ARRANGEMENT FOR A GAS TURBINE ENGINE

CROSS-REFERENCE TO RELATED APPLICATIONS

This application is based upon and claims the benefit of priority from Indian Patent Application Number 201711036298 filed on Oct. 12, 2017 and UK Patent Application Number 1720831.5 filed on Dec. 14, 2017, the entire contents of which are herein incorporated herein by reference.

BACKGROUND

Technical Field

The present disclosure concerns an energy dissipation device, a pressure relief arrangement, and/or a gas turbine engine.

Description of the Related Art

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core. Airflow from the fan is split, with most of the air being directed through a bypass duct and the remainder of the air being directed to the engine core. A casing is provided around the engine core, and various components that protrude into the bypass duct connect to the engine core. In some gas turbine engine designs, an A-frame is provided between the engine core and an outer bypass casing for the transmission of torsional loads.

One or more emergency pressure relief doors may be provided for preventing over pressure in core components in an event such as a burst pipe or duct. Conventionally, a pressure relief door is hinged to an adjacent structure, for example the casing. The hinge is arranged to define the arc within which the door opens. A cable may be provided which connects the door to a mounting spaced from the door. The cable sets the limit of maximum opening of the door. A piston and cylinder arrangement is also connected between the door and the mount for dissipating energy in the event of the door opening. Conventionally, the cylinder includes a medium, such as a honeycomb, which the piston crushes when the door is opened. The extent the door opens needs to be restricted and energy needs to be dissipated during opening to avoid or reduce impacts with components of the gas turbine engine, so as to avoid the door damaging the impacted or associated components. However, the door needs to open quickly enough so as to effectively relieve pressure, so as to avoid damage from the high pressure conditions. Generally, the door should not be decelerated until there is sufficient vent area to prevent overpressure.

The cable, piston and cylinder arrangement is fairly complex and it can be susceptible to mechanism failures over time.

SUMMARY

According to an aspect there is provided a pressure relief arrangement for a gas turbine engine. The arrangement comprises a hinged door and a mount. The arrangement further comprises a plastically deformable member provided between and coupled to the hinged door and the mount. The deformable member is configured to deform between a non-deformed state when the door is in a closed position and an elongated deformed state when the door is in an open position.

Plastic deformation of the deformable member dissipates energy to control movement of the door from the closed position to the open position.

The direct distance between two ends of the plastically deformable member may increase by more than or equal to 10%, 20%, 30%, 40%, 50%, 60% in the elongated deformed state compared to the non-deformed state.

The plastically deformable member may be coupled to the hinged door via an articulated link.

The articulated link may be pivotally connected to the door and to the deformable member, so that the articulated link can pivot between a first position when the door is in a closed position and a second position when the door is in an open position.

The deformable member may comprise one or more bends that deviate from a linear path between opposite ends of the deformable member.

Each of the bends of the deformable member may curve through 180°.

The radius of each bend may be at least five times the width of the deformable member measured in a plane parallel to the plane in which the radius of curvature lies.

The bends may be asymmetric about a line that extends between opposite ends of the deformable member.

The bends may be symmetric about a line that extends between opposite ends of the deformable member.

The deformable member may be made from a plurality of stacked elements. Each stacked element may extend fully between opposite ends of the deformable member.

The stacked elements may be considered to be stacked in a thickness direction of the deformable member.

The stacked elements may be identical in shape, size, and/or material.

The stacked elements may be cut from sheet or plate.

The deformable member may be made from a metal.

According to an aspect there is provided a gas turbine engine comprising the arrangement according to the previous aspect.

The gas turbine engine may comprise an engine core and a casing member surrounding the engine core. The mount may be provided radially internally of the core casing member and the door being arranged to pivot outwardly away from the core (e.g. towards a bypass duct of the engine).

According to an aspect there is provided an energy dissipation device comprising a plurality of elements stacked on top of each other and each element extending between a first end and a second end. Each of the elements includes one or more bends, and is arranged such that the device can move between a non-deformed state and an elongated deformed state. In the elongated deformed state the one or more bends are straightened out.

The energy dissipation device may have one or more features of the plastically deformable member of the arrangement of the previous aspect.

According to an aspect there is provided a pressure relief arrangement for a gas turbine engine, the arrangement comprising a hinged door; a mount; and a plastically deformable member provided between and coupled to the hinged door and the mount, the deformable member comprising a plurality of stacked elements comprising one or more bends that deviate from a linear path between opposite ends of the deformable member.

The skilled person will appreciate that, except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
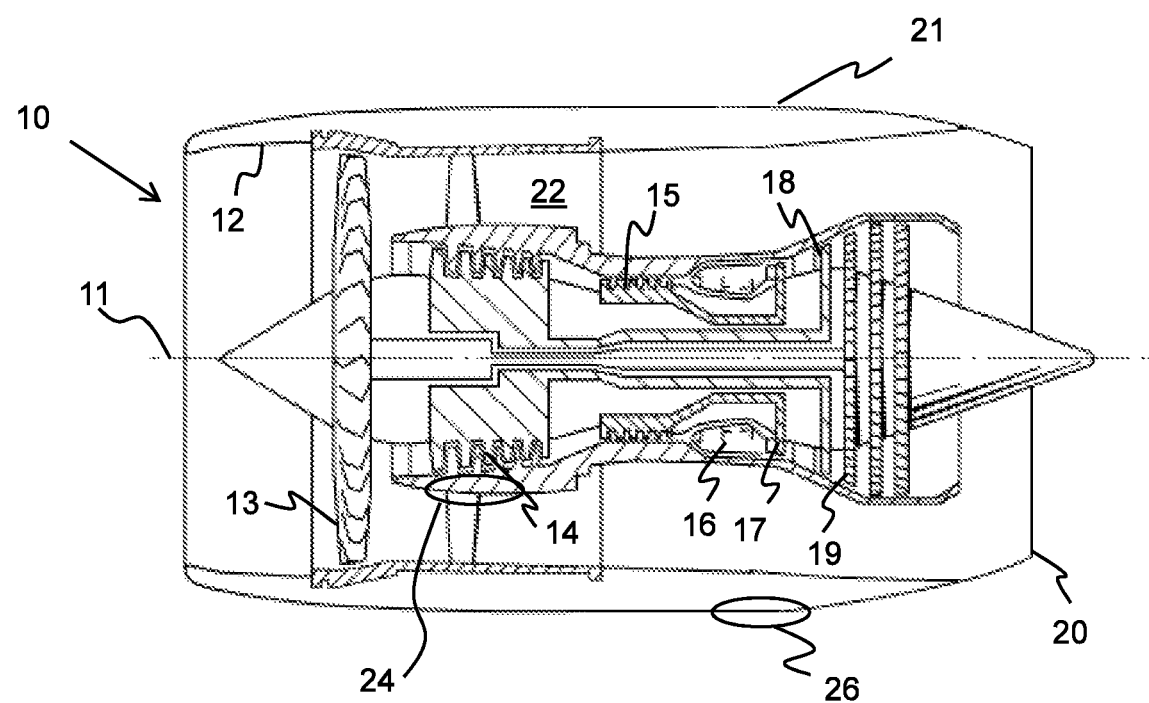
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan. A pressure relief arrangement may be provided at a location between the core and the bypass duct, the location of the pressure relief arrangement is indicated generally at 24 in FIG. 1. In some embodiments, a further pressure relief valve may be provided in a location indicated generally at 26. Often pressure relief arrangements are provided on the edge of ventilation zones to provide pressure relief in the event of a pipe or duct failure.

Figure 2:
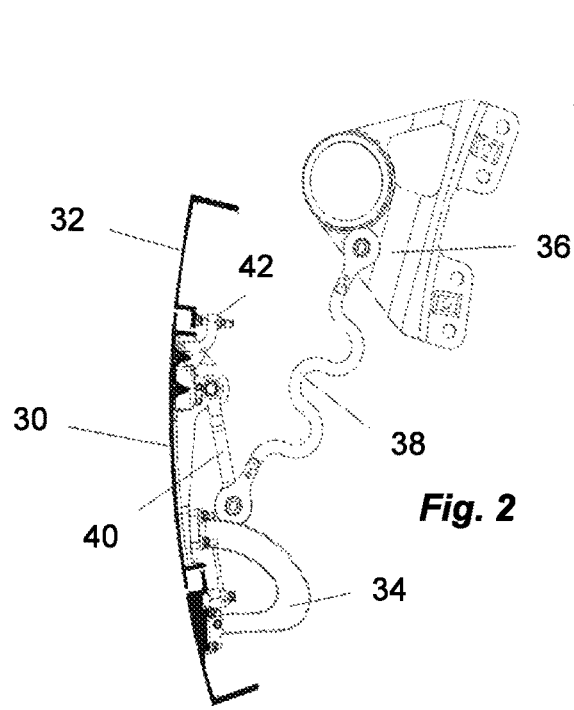
FIG. 2 is a side view of a pressure relief arrangement with a door in a closed position.
Figure 3:
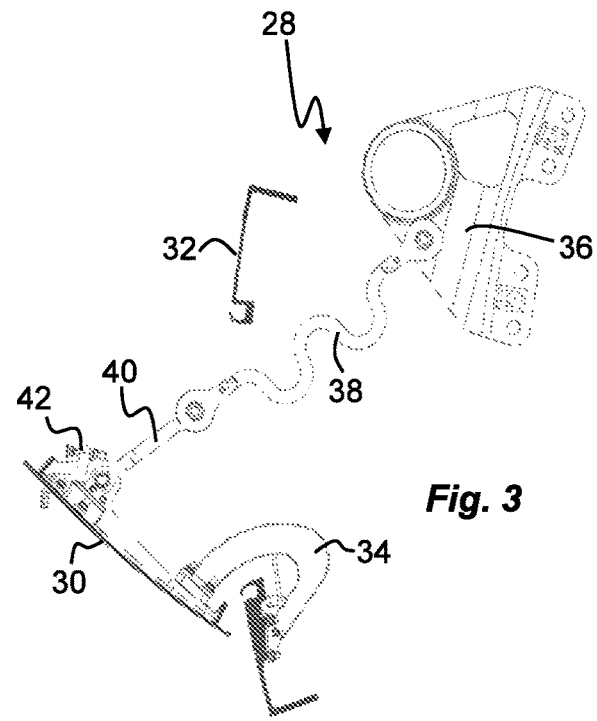
FIG. 3 is a side view of a pressure relief arrangement with a door in a partially open position.
Figure 4:
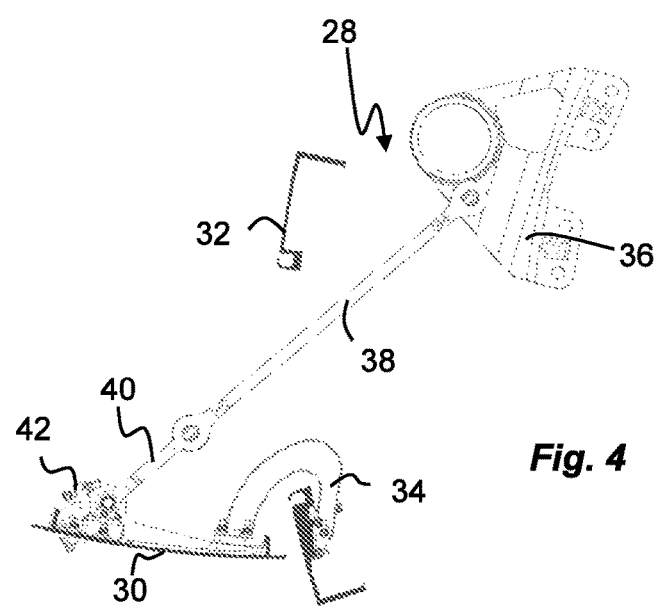
FIG. 4 is a side view of a pressure relief arrangement with a door in an open position.

Referring to FIG. 2 to FIG. 4, a pressure relief arrangement is indicated generally at 28. The pressure relief arrangement includes a door 30 which is connected via a hinge 34 to a wall 32 of a compartment. The compartment is one in which pressure can undesirably build up if the pressure relief arrangement is not provided, for example a ventilation zone of a gas turbine engine. In a closed position, as shown in FIG. 2, the door forms a continual barrier to the compartment with the compartment walls. The hinge 34 is substantially u-shaped, with one end of the u-shape being connected to the door and the other to the compartment wall.

A mount 36 is provided. In the present example the mount is mounted to a core component or casing. A plastic deformable member 38 is pivotally connected to the mount 36. The deformable member 38 is coupled to the door 30 via an articulated link 40. The link 40 is pivotally connected to the door 30 and to the deformable member 38. The door is pivotally connected at one end of the link and the deformable member is pivotally connected at an opposite end of the link. The link 40 is rigid, and may be for example a bar member.

The door 30 is held in a closed position by a latch 42. The latch is pressure sensitive and configured to release when the pressure in the compartment/the pressure differential across the door reaches a given predetermined pressure. The latch may be configured to mechanically fail at a given pressure, or it may comprise a pressure sensor arrangement configured to release the latch at a given pressure.

Figure 5:
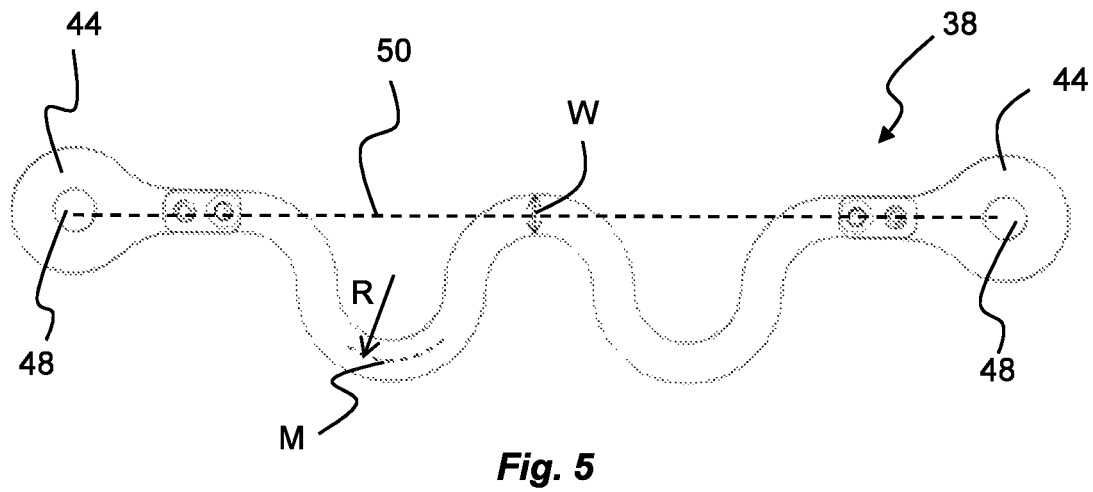
FIG. 5 is a side view of a deformable member of the pressure relief arrangement of FIG. 3 to FIG. 4.
Figure 6:
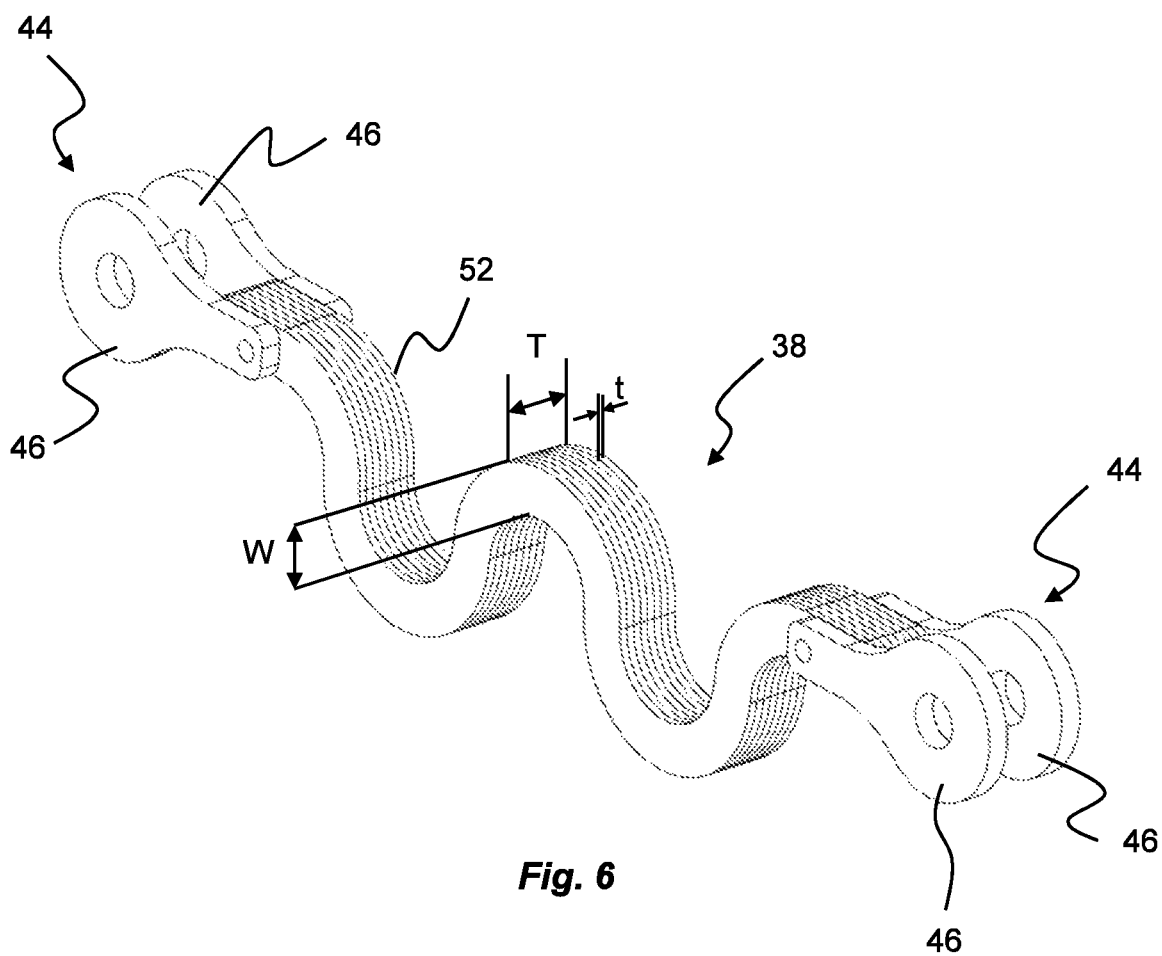
FIG. 6 is a perspective view of the deformable member of FIG. 5.

Referring to FIG. 5 and FIG. 6, the deformable member 38 includes a lug 44 at each end. In the present example, each lug includes two lug members 46, one connected on each lateral side of the deformable member. In the present example, the lugs include a hole 48 for pivotable connection to the articulated link and mount previously described. The ends of the deformable member, and therefore the lugs also, are directly opposed each other, e.g. they lie on a linear line that extends directly between the ends of the deformable member (illustrated by dotted line 50).

The deformable member 38 includes a plurality of curves, in this example three curves, but any suitable number of curves may be provided. The curves cause the deformable member 38 to deviate from the linear line 50 that extends between the two ends of the deformable member. In the present example, the curves bend through 180°. For example, in the present example, in the orientation shown in FIG. 5, the deformable member includes a concave curve proximal each end of the deformable member and a convex curve therebetween. A central line through the deformable member bends away from the linear line 50 and then bends back towards the linear line 50, before bending away and then back towards the linear line 50. The width W of the deformable member and the radius of the curves is such that the aspect ratio of a radius R of a mid-line M of each bend to the width W is greater than or equal to 5:1.

The deformable member includes a plurality of stacked elements 52. The elements may be considered to be plate elements. In the present example, each element is cut from flat plate. Each element 52 has the same shape, in that each defines the curves of the deformable member described above. In the present example, each element has the same thickness and is made from the same material. The ratio of element thickness t to element width W is less than 1:1. The elements stack together so as to define the thickness T of the deformable member. The ratio of the thickness T of the deformable member and the width W of the deformable member is greater than or equal to 1:1.

Referring back to FIG. 2, during operation, in normal operating conditions, the door 30 is in a closed position. In the closed position, the door is aligned with the wall 32 of an engine component, e.g. a casing member of the core or a nacelle panel. The articulated link 40 forms an acute angle with the door and with the deformable member 38. The door, articulated link, and deformable member may be considered to define a z-shape in the closed position. The deformable member is considered to be in a non-deformed state.

In an overpressure event, the latch 42 opens. This allows the door to move towards an open position (shown in FIG. 4). Referring to FIG. 3, when the latch opens, the door 30 starts to open, and rotates the articulated link 40 with it. The articulated link rotates until it is substantially aligned with a line that extends between the two ends of the deformable member. In such a position, the door, articulated link, and deformable member may be considered to define an L-shape. Once the articulated link is in the position shown in FIG. 3, the door's opening movement starts to apply a tension load to the deformable member 38.

Referring to FIG. 4, the application of tension to the deformable member 38 causes the deformable member to move from a non-deformed state to an elongated state. When the deformable member elongates, the bends straighten out, such that at in a fully elongate state, the deformable member may be considered to be straight instead of including bends. The force required to straighten these bends is less than the force that would induce necking in the deformable member. The elongate state of the deformable member may be up to 180% longer along a line extending directly from end to end of the deformable member (i.e. line 50 of FIG. 5), than in the non-deformed state. When the deformable member is elongated it is plastically deformed.

During movement of the door between the closed and open state, provision of the articulated link means that the door can be released quickly, to quickly start to relieve pressure. The opening of the door is then controlled by deformation of the deformable member. Elongation of the bends of the deformable member dissipates energy by local tensile and compressive strain, which controls the opening of the door to reduce the risk of damaging impact with gas turbine engine components.

The deformable member is designed such that the deformable member can elongate by up to 180% of the non-deformed state, as discussed above, and this means that the system can be designed with a higher margin of safety between design elongation (e.g. energy fully dissipated) and tensile failure of the device.

The deformable member has no moving parts or internal cavities, so it presents a lower dormant risk for an engine compartment than the conventional energy dissipation devices, e.g. cylinder devices. There is also no or minimal friction within the deformable member during operation, and it has low inherent flexibility in the dormant state.

Forming the deformable member from a plurality of stacked elements means that the elements can be cut from flat plate. Cutting the elements removes the need to plastically deform material during manufacture, and can reduce inter-part variation. Manufacture of the deformable member can be lower cost and quicker than conventional energy dissipation devices.

The use of a plurality of stacked elements also means that the loading accommodated by the deformable member can be easily adjusted, for example by removing or adding elements to the stack of elements.

The geometry of the deformable member may be varied from that illustrated in the figures in a number of ways. For example, the curves in the deformable member may be symmetrical about the line 50 instead of being asymmetrical. Straight portions may be provided between the curves of the deformable member, for example parallel to and/or perpendicular to the line 50. The lugs at the ends of the deformable member may be altered, for example a single lug may be provided instead of a clevis arrangement, or an alternative connection member may be provided at the end of the deformable member.

In some embodiments, strain gauges or discrete conductive elements may be integrated into the deformable member, which could be electronically monitored during engine operation. A certain delta in signal (e.g. change of resistance or open circuit) could indicate that the device has become elongated and could therefore serve as a detection system for compartment overpressure.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine comprising
a pressure relief arrangement pressure relief arrangement including
a hinged door;
a mount; and
a plastically deformable member provided between and coupled to the hinged door and the mount, the deformable member being configured to deform between a non-deformed state when the door is in a closed position and an elongated deformed state when the door is in an open position, wherein the plastically deformable member is coupled to the hinged door via an articulated link.

2. The gas turbine engine according to claim 1, wherein the articulated link is pivotally connected to the door and to the plastically deformable member, so that the articulated link can pivot between a first position when the door is in the closed position and a second position when the door is in the open position.

3. A gas turbine engine comprising
a pressure relief arrangement pressure relief arrangement including
a hinged door;
a mount; and
a plastically deformable member provided between and coupled to the hinged door and the mount, the deformable member being configured to deform between a non-deformed state when the door is in a closed position and an elongated deformed state when the door is in an open position, wherein the plastically deformable member is made from a plurality of stacked elements, each stacked element extending fully between the opposite ends of the plastically deformable member.

4. The gas turbine engine according to claim 3, wherein the stacked elements are identical in shape and size, and optionally material.

5. The gas turbine engine according to claim 3, wherein the stacked elements are cut from sheet or plate.

6. A gas turbine engine comprising
a pressure relief arrangement pressure relief arrangement including
   a hinged door;
   a mount; and
   a plastically deformable member provided between and coupled to the hinged door and the mount, wherein the plastically deformable member comprises one or more bends that deviate from a linear path between opposite ends of the plastically deformable member, the plastically deformable member being configured to deform between a non-deformed state in which the plastically deformable member has a first length measured between the opposite ends of the plastically deformable member in a direction of the linear path when the door is in a closed position and an elongated deformed state in which the one or more bends straighten out and cause the plastically deformable member to plastically deformed and have a second length measured between the opposite ends of the plastically deformable member in the direction of the linear path when the door is in an open position, the second length being greater than the first length.

7. The gas turbine engine according to claim 6, wherein each of the one or more bends of the plastically deformable member curve through 180°.

8. The gas turbine engine according to claim 6, wherein the radius of each bend of the one or more bends is at least five times the width of the plastically deformable member measured in a plane parallel to the plane in which the radius of curvature lies.

9. The gas turbine engine according to claim 6, wherein the one or more bends are asymmetric about a line that extends between the opposite ends of the plastically deformable member.

10. The gas turbine engine according to claim 6, wherein the one or more bends are symmetric about a line that extends between the opposite ends of the plastically deformable member.

11. The gas turbine engine according to claim 6, wherein the plastically deformable member is made from a metal.

12. The gas turbine engine according to claim 6, comprising an engine core, and a casing member surrounding the engine core, and wherein the mount is provided radially internally of the core casing member and the door being arranged to pivot outwardly away from the core.

13. The gas turbine engine according to claim 6, wherein each of the one or more bends is U-shaped.

14. The gas turbine engine according to claim 6, wherein the plastically deformable member is pivotably coupled with the hinged door and pivotably coupled with the mount.

15. The gas turbine engine according to claim 6, wherein the one or more bends comprises alternating convex and concave curves.

16. The gas turbine engine according to claim 6, wherein the plastically deformable member is made from a plurality of stacked elements, each stacked element extending fully between the opposite ends of the plastically deformable member.

* * * * *